J. W. DALMAN.
MEANS FOR ELIMINATING THE GLARE OF LAMPS.
APPLICATION FILED AUG. 22, 1910.
1,001,733.
Patented Aug. 29, 1911.
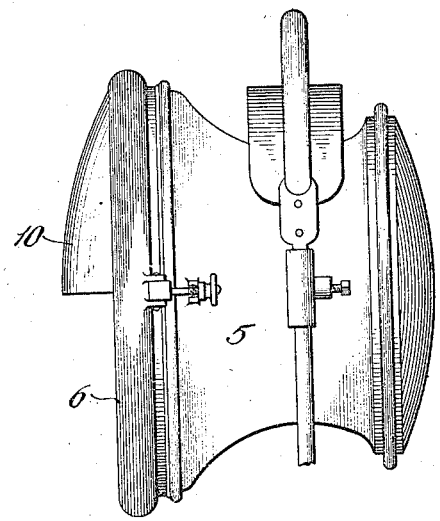
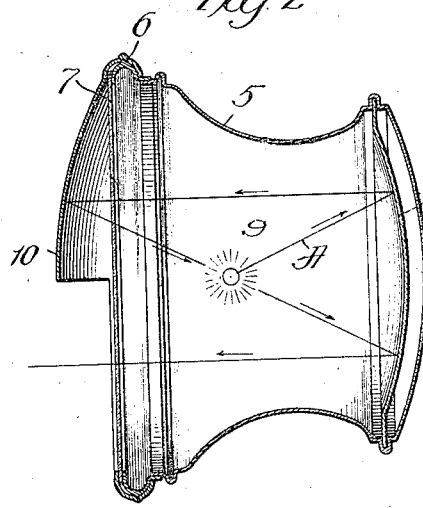
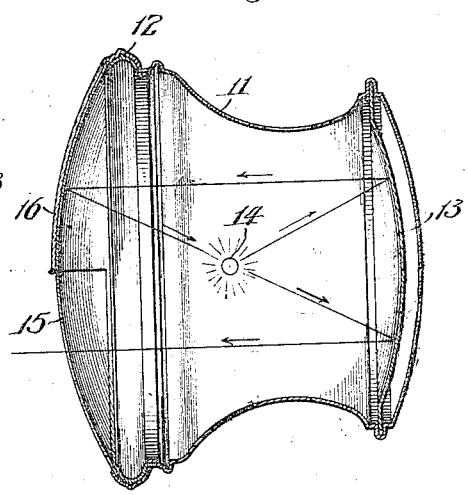
Witnesses:
Geo. C. Lavin
F. D. Butler.
Inventor
John W. Dalman,
By Charles F. Murray
Atty

UNITED STATES PATENT OFFICE.

JOHN W. DALMAN, OF CHICAGO, ILLINOIS.

MEANS FOR ELIMINATING THE GLARE OF LAMPS.

1,001,733.   Specification of Letters Patent.   Patented Aug. 29, 1911.

Application filed August 22, 1910.  Serial No. 578,371.

*To all whom it may concern:*

Be it known that I, JOHN W. DALMAN, a citizen of the United States, residing at Chicago, in the county of Cook and State of Illinois, have invented certain new and useful Means for Eliminating the Glare of Lamps, of which the following is a specification.

My invention relates to automobile lamps and has particular reference to means whereby the glare of these or other such lamps may be eliminated without decrease in light value.

My invention should not be understood as merely the application of the well known hood to lamps for this or other purposes, as such devices decrease the light value to the extent that the lens opening is obscured.

It is a well known fact that the glare of automobile or other lamps is a serious inconvenience and menace to pedestrians and others, and the use of the "front" lamps on automobiles is prohibited in many cities for this reason. By providing such hood or by painting a portion of the lens opening, this difficulty is obviated, but at a cost of a corresponding amount of the light value of the lamp.

My invention discloses how the objectionable glare may be eliminated, without loss of light value.

In the device of my invention, it will be observed that a reverse reflector forms a part of the lens opening and that the radius of curvature is substantially the same in both the front and rear reflectors; that the source of light is located at a point midway between the point of convergence of the reflected rays from either reflector.

My invention will be more readily understood by reference to the accompanying drawings, in which;

Figure 1 is a side elevation of an automobile lamp constructed in accordance with my invention; Fig. 2 is a sectional elevation thereof, and Fig. 3 is a modification of the construction of Figs. 1 and 2, and showing a lens having the reflector formed as a part thereof.

Referring more particularly to the drawings, it will be seen that the lamp of my invention is composed of a casing, 5, having a hinged front portion, 6, a lens, 7, a back reflector, 8, a source of light, 9, and a front reflector or hood, 10.

In Figs. 2 and 3, the travel of the light rays is shown diagrammatically and will now be explained. As is well known, if the source of light is placed at a distance from a reflector, equal to the radius of curvature of the reflector, the reflected rays will converge at the source of light. As the source of light is moved toward the reflector and within the radius thereof, the convergence of the rays will be at a point at a distance without the radius equal to the distance within the radius where the source of light is placed. Therefore it will be seen that by forming the outside and inside reflectors of equal radius and locating them at a distance equal to each other's radius, and placing the light at a point half-way therebetween, that a ray which I have marked A, will follow the line as indicated by the arrow in Figs. 2 and 3, and that any rays which would be wasted if a portion of the lens opening were obscured, are reflected back to the rear reflector and thence outward. Thus none of the rays are lost.

In the modification of Fig. 3, the casing, 11, has the hinged opening, 12, a rear reflector, 13, source of light, 14, and a convex lens, 15, a portion, 16, of which is so formed as to provide the necessary reflector. As this and many other forms are within the scope of my invention, I do not wish to be limited to the precise construction herein shown.

I claim:

1. A light projector comprising, in combination, a casing having an opening, a source of light, a main reflector, and a shade covering the upper portion of the projection opening and provided interiorly with a reflector adapted to reflect rays back upon said main reflector at proper angles for projection through the unobstructed portion of said projection opening, substantially as described.

2. Means for eliminating the glare of lamps which comprise, in combination a lamp casing having an opening, a source of light, a reflector in said casing, and a reflector in front of said source of light and shading the upper portion of the opening in said casing, said front reflector being adapted to reflect a portion of the rays from said source of light to the reflector in said casing back of the vertical plane of said source of light, and thence out through the unobstructed portion of said opening, substantially as described.

3. A light projector comprising, in combination, a source of light, a casing, a main reflector within said casing, and a supplemental reflector disposed in the path of a portion of the rays from said source of light, the focal point of the reflected rays from said supplemental reflector being coincident with a point on the surface of said main reflector, substantially as described.

4. A light projector comprising, in combination, a source of light, a main reflector, a casing within which said reflector is mounted, and a supplemental reflector disposed over substantially the upper half of the projection opening in said casing, the focal point of the reflected rays from said supplemental reflector being coincident with a point on the surface of said main reflector, substantially as described.

5. An automobile lamp, comprising in combination, a casing having a lens opening therein, a reflector within said casing, a source of light, a reflector obstructing the outward passage of rays from said source of light over a portion of said lens opening, the radius of curvature of the two reflectors being substantially the same.

JOHN W. DALMAN.

Witnesses:
C. J. HOLLAND,
D. T. HARRIS.